United States Patent
Lazaridis (12)

(10) Patent No.: US 10,951,571 B2
(45) Date of Patent: *Mar. 16, 2021

(54) COLOR DIFFERENTIATING A TEXT MESSAGE SHOWN IN A LISTING ON A COMMUNICATION DEVICE

(71) Applicant: BlackBerry Limited, Waterloo (CA)

(72) Inventor: Mihal Lazaridis, Waterloo (CA)

(73) Assignee: BlackBerry Limited, Waterloo (CA)

( * ) Notice: Subject to any disclaimer, the term of this patent is extended or adjusted under 35 U.S.C. 154(b) by 703 days.

This patent is subject to a terminal disclaimer.

(21) Appl. No.: 14/795,156

(22) Filed: Jul. 9, 2015

(65) Prior Publication Data

US 2015/0312198 A1 Oct. 29, 2015

Related U.S. Application Data

(63) Continuation of application No. 12/621,166, filed on Nov. 18, 2009, now abandoned, which is a continuation-in-part of application No. 11/859,614, filed on Sep. 21, 2007, now Pat. No. 8,265,665.

(51) Int. Cl.
*H04L 12/50* (2006.01)
*H04L 12/58* (2006.01)
*H04M 1/725* (2021.01)
*G06F 3/0482* (2013.01)
*G06F 3/0484* (2013.01)

(52) U.S. Cl.
CPC ............ *H04L 51/28* (2013.01); *G06F 3/0482* (2013.01); *G06F 3/04842* (2013.01); *H04M 1/72552* (2013.01); *H04M 1/72544* (2013.01)

(58) Field of Classification Search
CPC .............................. G06F 3/0482; H04L 51/28
See application file for complete search history.

(56) References Cited

U.S. PATENT DOCUMENTS

| 5,675,733 A | 10/1997 | Williams |
| 5,694,616 A | 12/1997 | Johnson et al. |
| 5,765,170 A | 6/1998 | Morikawa |

(Continued)

FOREIGN PATENT DOCUMENTS

| CN | 1431615 | 7/2003 |
| EP | 413537 | 2/1991 |

(Continued)

OTHER PUBLICATIONS

Win32 based sensor for email auditing, Budnikov, K.I.; Kurochkin, A.v.; Lylov, SA, IEEE Region 8 International Conference on Computational Technologies in Electrical and Electronics Engineering, 2008. SIBIRCON 2008. 286-287, Jul. 21-25, 2008.

(Continued)

*Primary Examiner* — Roland J Casillas
(74) *Attorney, Agent, or Firm* — Fish & Richardson P.C.

(57) ABSTRACT

An apparatus and method for receiving and sending messages from a communication device is disclosed. Message recipient information is compared to stored information for potential recipients to determine whether a characteristic of the expression of the message on a device display should be changed such that the user perceives an unavoidable visual indication relating to the result of the comparison.

39 Claims, 11 Drawing Sheets

(56) References Cited

U.S. PATENT DOCUMENTS

| | | | |
|---|---|---|---|
| 5,765,178 A * | 6/1998 | Tanaka | G06Q 10/107 715/205 |
| 5,802,455 A | 9/1998 | Nishiyama | |
| 6,052,709 A | 4/2000 | Paul | |
| 6,161,130 A | 12/2000 | Horvitz et al. | |
| 6,192,396 B1 * | 2/2001 | Kohler | G06Q 10/107 707/999.005 |
| 6,321,267 B1 | 11/2001 | Donaldson | |
| 6,519,630 B1 | 2/2003 | Hanawa | |
| 6,574,671 B1 * | 6/2003 | Haynes | G06Q 10/107 709/245 |
| 6,651,217 B1 | 11/2003 | Kennedy et al. | |
| 6,665,842 B2 | 12/2003 | Nielsen | |
| 6,671,718 B1 | 12/2003 | Meister et al. | |
| 6,700,591 B1 * | 3/2004 | Sharpe | G06F 3/04897 715/762 |
| 7,072,688 B2 | 7/2006 | Bodnar et al. | |
| 7,096,036 B2 | 8/2006 | Griffin et al. | |
| 7,107,544 B1 | 9/2006 | Luke | |
| 7,389,322 B1 | 6/2008 | Miyazawa | |
| 7,499,976 B2 | 3/2009 | Cato | |
| 7,565,404 B2 | 7/2009 | Gwozdz | |
| 7,801,960 B2 | 9/2010 | Hockey | |
| 7,865,555 B2 | 1/2011 | Willey | |
| 7,873,725 B2 | 1/2011 | Westphal | |
| 2001/0026609 A1 | 10/2001 | Weinstein et al. | |
| 2002/0111887 A1 | 8/2002 | McFarlane et al. | |
| 2002/0112015 A1 * | 8/2002 | Haynes | H04L 63/0428 709/206 |
| 2002/0194002 A1 | 12/2002 | Petrushin | |
| 2002/0194284 A1 * | 12/2002 | Haynes | G06Q 10/107 709/206 |
| 2003/0084109 A1 * | 5/2003 | Balluff | G06F 3/0481 709/206 |
| 2003/0135572 A1 | 7/2003 | Katada | |
| 2003/0236847 A1 | 12/2003 | 8enowitz et al. | |
| 2004/0018858 A1 | 1/2004 | Nelson | |
| 2004/0030887 A1 | 2/2004 | Harrisville-Wolff et al. | |
| 2004/0068543 A1 | 4/2004 | Seifert | |
| 2004/0103162 A1 | 5/2004 | Meister et al. | |
| 2005/0101296 A1 | 5/2005 | Ito et al. | |
| 2005/0144570 A1 * | 6/2005 | Loverin | G06F 3/0481 715/822 |
| 2005/0165895 A1 | 7/2005 | Rajan et al. | |
| 2006/0004843 A1 | 1/2006 | Tafoya et al. | |
| 2006/0020672 A1 | 1/2006 | Shannon et al. | |
| 2006/0098650 A1 | 5/2006 | Beninato et al. | |
| 2007/0204063 A1 | 8/2007 | Banister et al. | |
| 2007/0288575 A1 | 12/2007 | Gillum et al. | |
| 2007/0294390 A1 | 12/2007 | Willey | |
| 2008/0168347 A1 | 7/2008 | Hallyn | |
| 2009/0106266 A1 | 4/2009 | Donatelli et al. | |
| 2009/0291665 A1 | 11/2009 | Gaskarth et al. | |
| 2010/0100448 A1 | 4/2010 | Heigold et al. | |
| 2011/0202824 A1 | 8/2011 | Raje | |

FOREIGN PATENT DOCUMENTS

| | | |
|---|---|---|
| EP | 420779 | 3/1991 |
| EP | 1096744 | 5/2001 |
| EP | 1767008 | 3/2007 |
| EP | 1871059 | 12/2007 |
| GB | 2353679 | 2/2001 |
| WO | 9904353 | 1/1999 |

OTHER PUBLICATIONS

European Search Report 07117003.9; dated Dec. 3, 2007.
European Patent Office, Extended European Search Report issued in European Patent Application No. 10184583.2, dated Nov. 29, 2010, 4 pages.
European Patent Office, European Search Report issued in EP application 06253152, dated Aug. 25, 2006, 1 page.
Extended European Search Report issued in European Application No. 16172399.4 dated Aug. 8, 2016.
Office Action issued in Indian Application No. 1976/DEL/2008 dated Jan. 22, 2020, 3 pages (With English Translation).
Office Action issued in Indian Application No. 1976/DEL/2008 dated Aug. 6, 2019, 3 pages (With English Translation).
Decision in Indian Application No. 1976/DEL/2008 on Oct. 11, 2019, 7 pages.

* cited by examiner

COLOR DIFFERENTIATING A TEXT MESSAGE SHOWN IN A LISTING ON A COMMUNICATION DEVICE

CROSS-REFERENCE TO RELATED APPLICATION

This application is a Continuation of U.S. patent application Ser. No. 12/621,166, "Message Distribution Warning Indication" filed on Nov. 18, 2009, which is a Continuation-in-Part of U.S. patent application Ser. No. 11/859,614, "Color Differentiating a Portion of a Text Message Shown in a Listing on a Handheld Communication Device" filed on Sep. 21, 2007 on behalf of Mihal Lazaridis and assigned to the assignee of the present application.

FIELD

This disclosure is directed to apparatus and method for a communication device that is capable of textual message transmission and reception, and more particularly is directed to such an apparatus and method for which a warning is presented to the user when a textual message is being distributed inappropriately.

BACKGROUND

Email has become a ubiquitous form of textual message exchange. It has become so commonplace that email users have come to regard its presence with the casualness of an intimate conversation. Despite the efforts of the business community in the education of its employees, people inadvertently leak proprietary information out of an organization by failing to verify that all of the designated recipients of that email (i.e., all of the names in the TO, CC and BCC address fields), are members of that organization (i.e., employees of the same company).

As one example, some email exchanges, which start out as communications marked as Attorney Client Privilege, may be continued among some of the recipients without including an attorney, thereby risking the claim of privilege for any material quoted within the email.

The problem of inappropriately distributing or redistributing email messages, at least as a result of human error, is unlikely to be thoroughly solved by education and policy mechanisms. Thus, a technology backstop is needed to reduce damage caused as a result of human error in creating or forwarding email messages.

DETAILED DESCRIPTION

The technology backstop for inappropriately distributing or redistributing a message, which is disclosed herein, is one that has particular relevance to handheld communication devices because of the small viewing screen and uncontrolled environment in which such a device is used. However, any system that handles messages, such as email messages, will substantially benefit from the claimed invention. Although the following disclosure is made with a handheld communication device as an example, the specification is not intended to be so limited.

Communication devices, handheld or otherwise, conventionally have display screens. A screen window, which may occupy the entire screen or a portion of the screen, is opened for the user when the user desires to create a message and activates a message creation program. In one embodiment such a program is an email program. The user, by way of a user interface, typically addresses the message to one or more recipients, provides a title to the message, and completes the body of the message with content. Or the user can forward a message created by another with a revised set of addressees and/or a new title. A microprocessor executes a stored program that compares the identification of the recipient addressees to identifications stored in memory and the program causes a signal to be unavoidably presented to the user via the display when there is a match between an identification of an addressee and the identifications stored in memory. Alternatively, the unavoidable signal is displayed when a match is not found between identifications. In another alternative embodiment, the comparison is made between keywords or other text found in the title or in the body content of the message. In another alternative embodiment, a comparison is made of cryptographic keys to determine whether a recipient addressee has the ability and right to decrypt a message. An absence of key match results in an unavoidable signal being presented to the user.

An unavoidable signal is presented on the communication device screen in such a manner that a user cannot reasonably avoid seeing the signal on the screen (or in a composition window on the screen). In one embodiment, a screen background color is changed, if a designated recipient is not in a group qualified to receive the message. In another embodiment, the background of a composition window, which does not occupy the entire communication device's screen, is changed. In another embodiment, a portion of a composition window, for example the outlining frame, is changed to a specified warning color-coded. The qualifications include employee status, valid encryption keys, subject line or message body keyword appropriateness, and similar parameters. Various other embodiments may combine features of these three exemplary embodiments.

Figure 1:
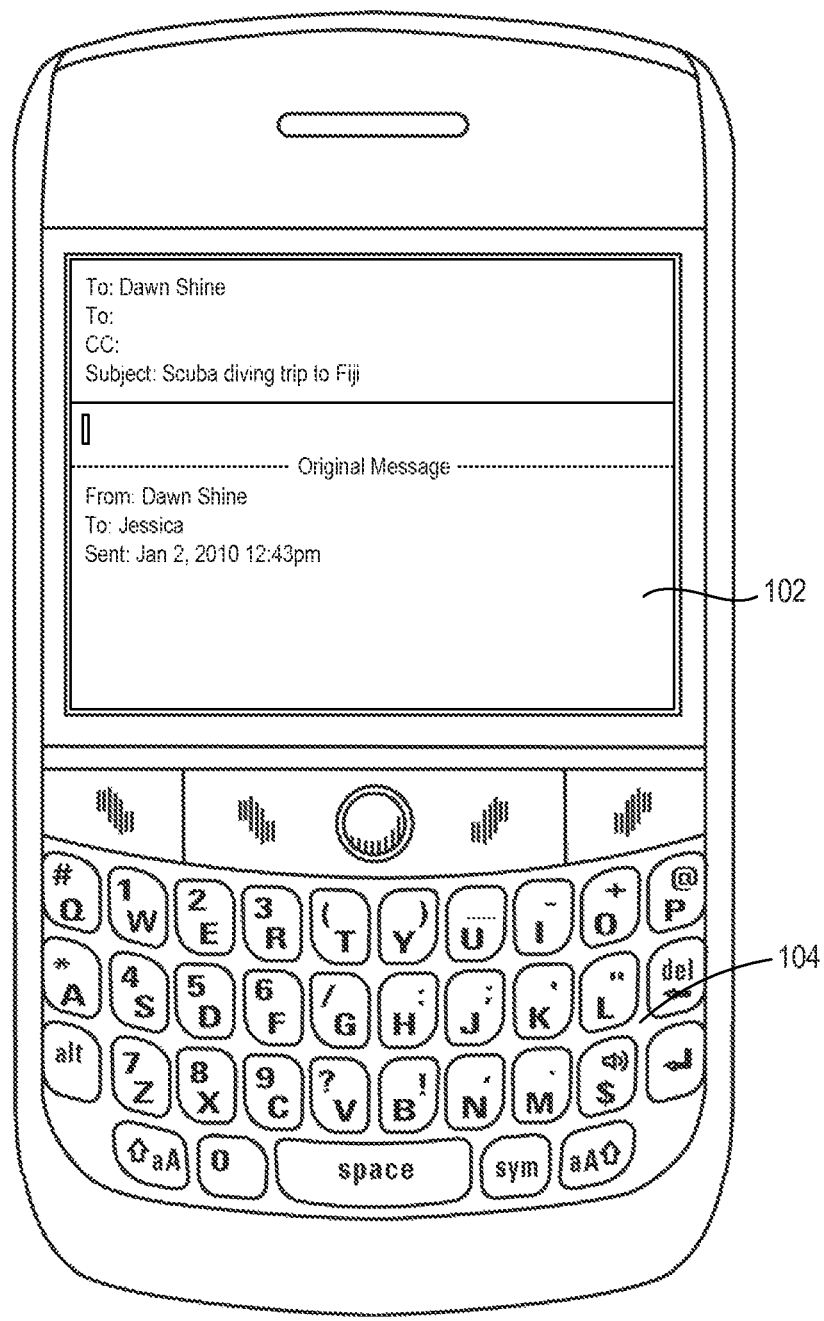
FIG. 1 illustrates a handheld wireless communication device.
Figure 2:
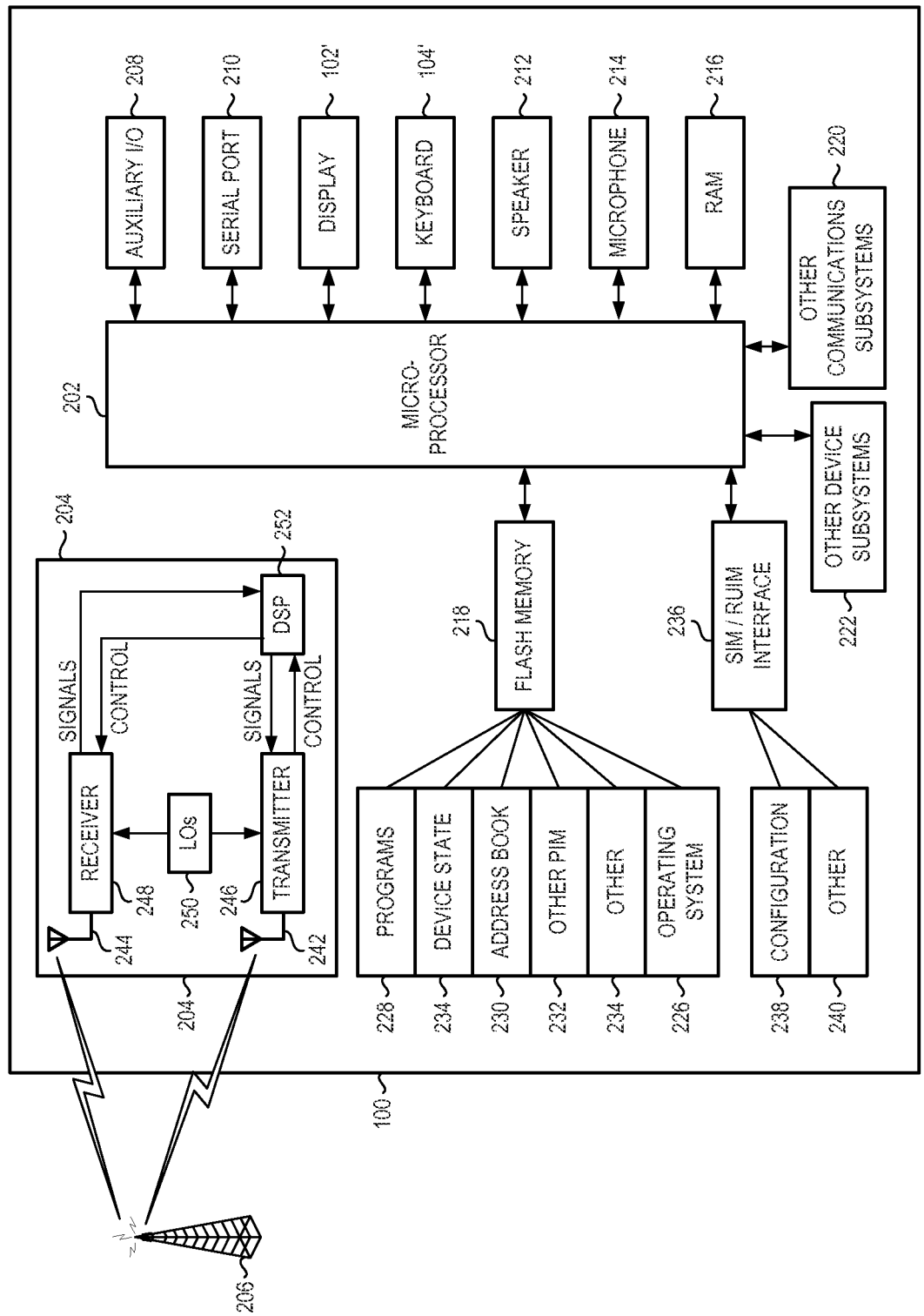
FIG. 2 is a block diagram representing a wireless handheld communication device interacting in a communication network.

An exemplary handheld communication device 100 is shown in FIG. 1. The device includes a hand cradleable body configured to be held in one hand by an operator of the device during use. Such a device is capable of receiving and transmitting textual messages, among other things, and an email message reply is representatively shown on its screen 102. Entry of a message by the user is accomplished via the keyboard 104. Communication with other users is achieved through a wireless network, in this example, and a representative block diagram of the wireless device 100 is illustrated in FIG. 2. The communication device 100 is also configured to send and receive voice communications such as mobile telephone calls. While a wireless embodiment is shown and described, it is expected that application of the claimed invention will be more widely found in other communication devices such as networked laptop and desktop computers and similar devices.

The device 100 in FIG. 2 includes a microprocessor 202 that controls the operation of the device 100. A communication subsystem 204 performs all communication transmission and reception with a wireless network, which is simply represented by element 206. The microprocessor 202 further connects with an auxiliary input/output (I/O) subsystem 208, a serial port (preferably a Universal Serial Bus port) 210, a display 102', a keyboard 104', a speaker 212, a microphone 214, random access memory (RAM) 216, and flash memory 218 (or its equivalent). Other communication subsystems 220 and other device subsystems 222 are generally indicated as being functionally connected with the microprocessor 202 as well. An example of a communication subsystem 220 is that of a short range communication system such as BLUETOOTH® communication module or a Wi-Fi communication module (a communication module in compliance with IEEE 802.11b) and associated circuits and components. Additionally, the microprocessor 202 is able to perform operating system functions and preferably enables execution of software applications on the communication device 100.

The auxiliary I/O subsystem 208 can take the form of a variety of different navigation tools (multi-directional or single-directional) such as a trackball navigation tool, or a thumbwheel, a navigation pad, a joystick, or the like. These navigation tools are preferably located on the front surface of the device 100. Other auxiliary I/O subsystems can include external display devices and externally connected keyboards (not shown).

The device 100 is equipped with components to enable operation of various computer programs, or sets of operating instructions for the microprocessor 202, as shown in FIG. 2. In an exemplary embodiment, the flash memory 218 is enabled to provide a storage location for a device operating system 226, device programs 228, and data. The operating system 226 is generally configured to manage other application programs 228 that are also stored in memory 218 and executable on the processor 202. The operating system 226 honors requests for services made by application programs 228 through predefined application program interfaces. More specifically, the operating system 226 typically determines the order in which multiple applications 228 are executed by the processor 202 and the execution time allotted for each application, manages the sharing of memory 218 among multiple applications 228, handles input and output to and from other device subsystems 222, and so on. In addition, users can typically interact directly with the operating system 226 through a user interface, usually including the keyboard 104' and display screen 102'. While in an exemplary embodiment the operating system 226 is stored in flash memory 218, the operating system 226 in other embodiments is stored in read-only memory (ROM) or similar storage element (not shown). As those skilled in the art will appreciate, the operating system 226, device application programs 228 or parts thereof may be loaded in RAM 216 or other volatile memory.

In the embodiment illustrated in FIG. 2, the flash memory 218 contains programs/applications 228 for execution in the device 100 including an address book 230, a personal information manager (PIM) 232, and the device state 234. Furthermore, programs 228 and other information 234 including data can be segregated upon storage in the flash memory 228 of the device 100.

When the device 100 is enabled for two-way communication with the wireless communication network 206, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the communication device 100 must be properly enabled to transmit and receive signals from the communication network 206. Other systems may not require such identifying information. GPRS, UMTS, and EDGE require the use of a Subscriber Identity Module (SIM) in order to allow communication with the communication network 206. Likewise, most CDMA systems require the use of a Removable Identity Module (RUIM) in order to communicate with the CDMA network. The RUIM and SIM card can be used in multiple different communication devices 100. The communication device 100 may be able to operate some features without a SIM/RUIM card, but it will not be able to communicate with the network 206. A SIM/RUIM interface 236 located within the device 100 allows for removal or insertion of a SIM/RUIM card (not shown). The SIM/RUIM card features memory and holds key configurations 238, and other information 240 such as identification and subscriber related information. With a properly enabled communication device 100, two-way communication between the communication device 100 and communication network 206 and ultimately with other users is possible.

If the communication device 100 is enabled as described above or the communication network 206 does not require such enablement, the two-way communication enabled device 100 is able to both transmit and receive information from the communication network 206. The transfer of communication can be from the device 100 or to the device 100. In order to communicate to the communication network 206, the device 100 in the presently described exemplary embodiment is equipped with an integral or internal transmitting antenna 242 for transmitting signals to the communication network 206. Likewise the communication device 100 in the presently described exemplary embodiment is equipped with another internal antenna, receiving antenna 244 for receiving communication from the communication network 206. These antennas (242, 244) in another exemplary embodiment are combined into a single antenna and, alternatively, be externally mounted (not shown).

When equipped for two-way communication, the communication device 100 features a communication subsystem 204. As is well known in the art, this communication subsystem 204 is modified so that it can support the operational needs of the device 100. The subsystem 204 includes a transmitter 246 and receiver 248 including the associated antennas as described above, local oscillators (LOs) 250, and a processing module 252 which in the presently described exemplary embodiment is a digital signal processor (DSP).

It is contemplated that communication by the device 100 with the wireless network 206 can be any type of communication that both the wireless network 206 and device 100 are enabled to transmit, receive and process. In general, these can be classified as voice and data. Voice communication is communication in which signals for audible sounds are transmitted by the device 100 through the communication network 206. Data is all other types of communication that the device 100 is capable of performing within the constraints of the wireless network 206.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the device 100 is significantly enhanced (if not enabled) when connectable within a communication system, and particularly when connectable on a wireless basis in a network 206 in which voice, text messaging, and other data transfer are accommodated.

When the device is capable of sending and receiving text messages such as email messages, an email software program is implemented on the handheld device. In some examples, the email software is a stand alone application. In other examples, the email software is integrated along with the operating system software. The email software program has an email application that is capable of displaying the email messages to the user. It is common that a listing of email messages be presented, along with a status of each message. It is a feature that the email software is capable of providing a color differentiation of the listed emails. This differentiation can also be realized through a grayscale differentiation as well. These color differentiations allow for common characteristics to be differentiated.

One common characteristic is the name of the sender or receiver of the email message. In another example, a common characteristic is a particular code associated with the sender or receiver of the email message. For example, emails from two different senders having the same host name would have the same color code. This can be helpful in determining emails from a particular organization or company that are sent via email. In one example, the email software is set up such that all emails that are from the sender's company or organization are identified by a particular color. Different groups or criteria can be used to generate different color differentiation and the device could be preset such that when a particular user's email address was entered, all emails received from a sender or sent to a recipient within the same organization would be color coded and all prohibited or otherwise restricted email messages would be differently colored.

Figure 3:
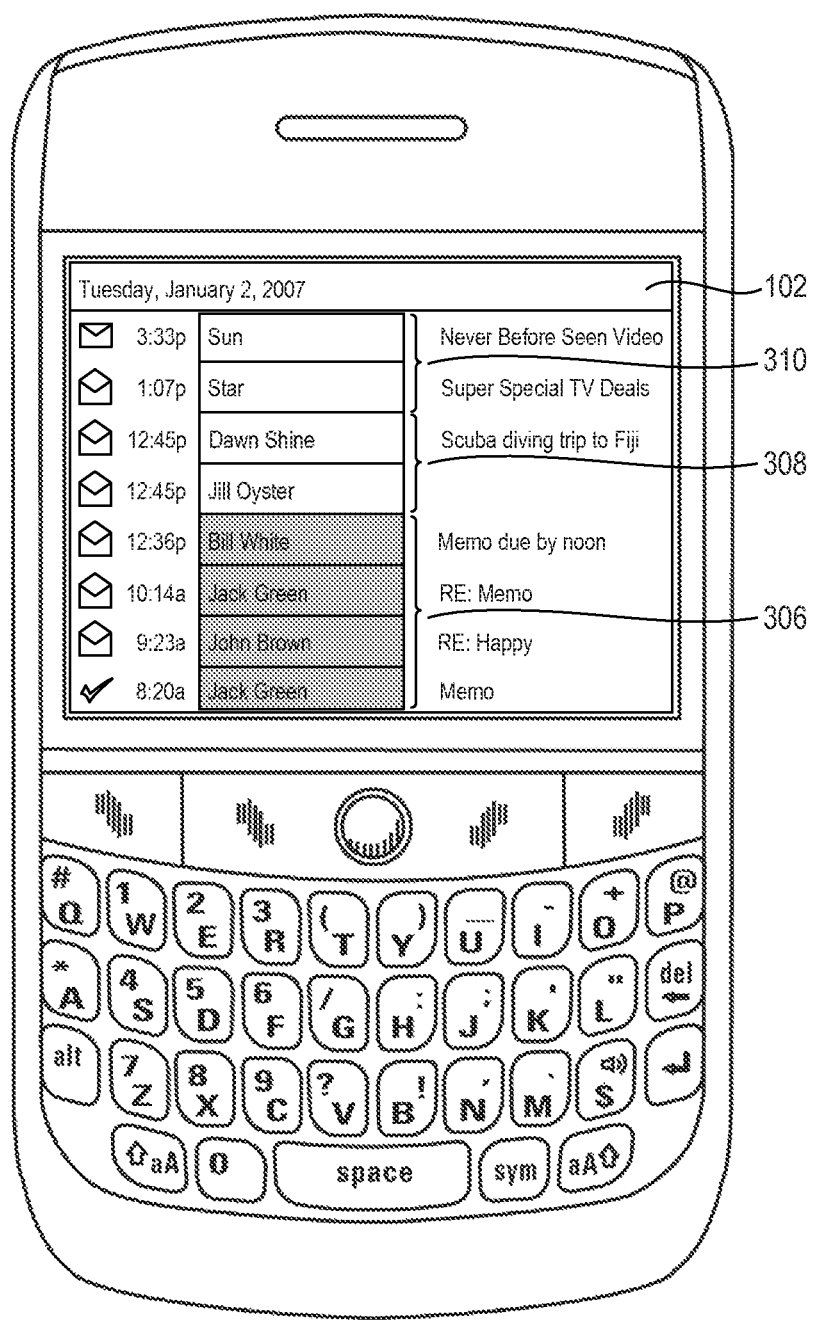
FIG. 3 illustrates the screen of a handheld device with an email listing shown on the display screen, where the email listing is differentiated using color based upon a common characteristic.
Figure 4:
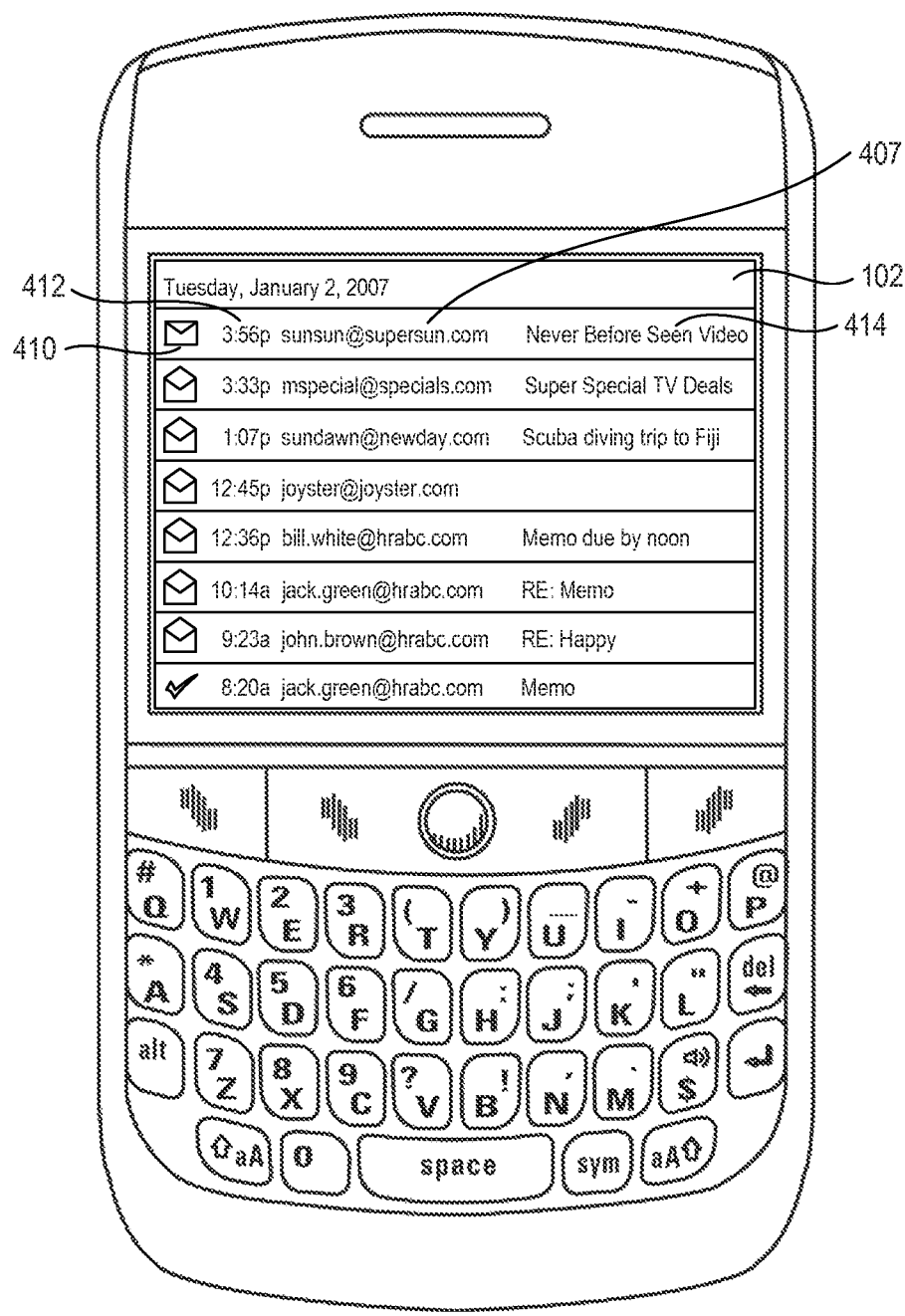
FIG. 4 illustrates another email listing shown on the display screen of a handheld device, where the each email is color differentiated based upon a common characteristic.
Figure 5:
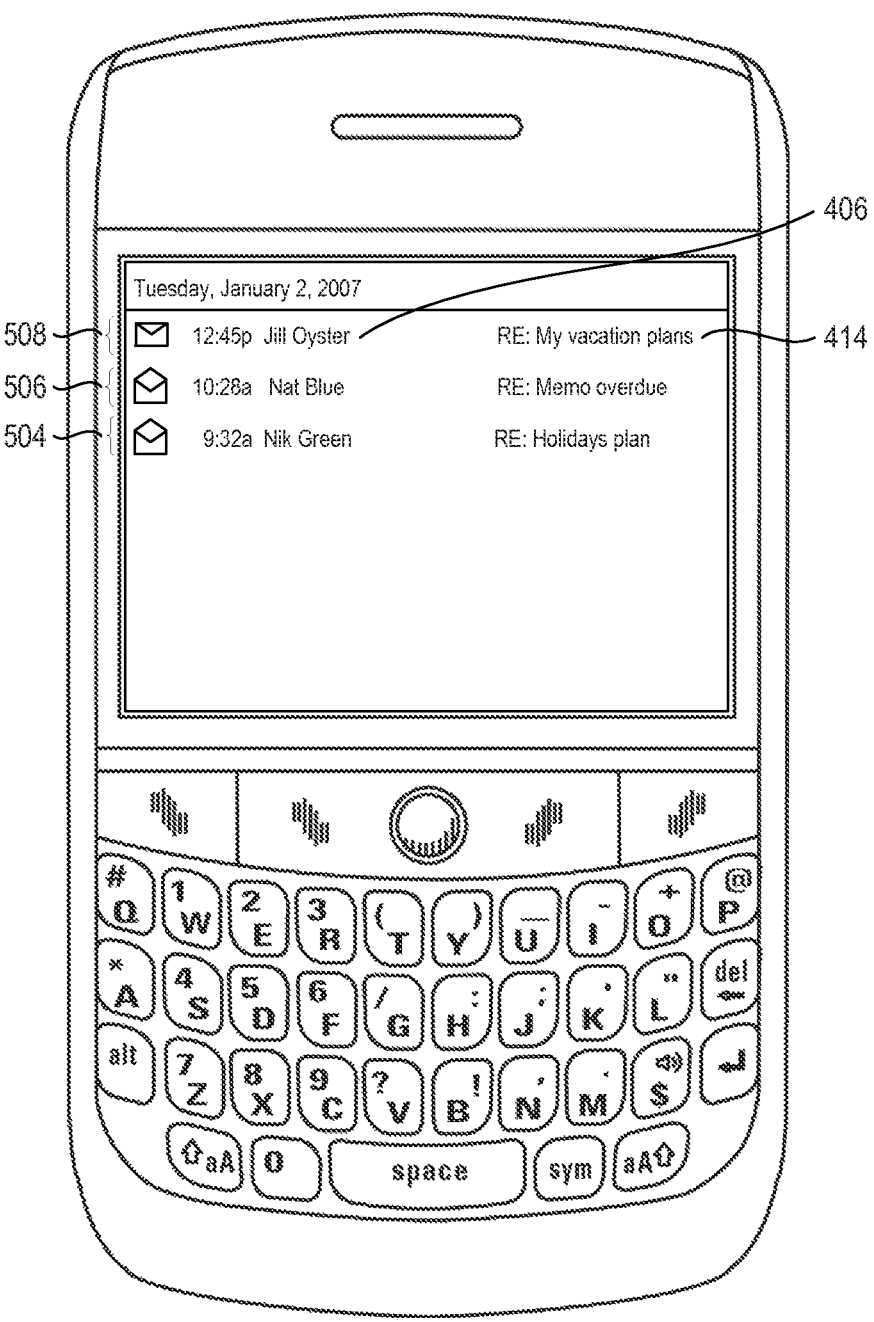
FIG. 5 illustrates yet another email listing shown on the display screen of a handheld wireless communication device, where the each email is color differentiated based upon a common characteristic.

The color coding of the emails is achieved through a variety of different ways. Some particular examples are provided herein, but these examples do not limit the scope of this disclosure and one skilled in the art would appreciate other color-coding possibilities. For example as shown in FIG. 3, when a user has the email display application programmed such that names 302 of the senders or recipients are displayed, the names 302 of the sender or recipient are colored according to the different color scheme. Alternatively as shown in FIG. 4, all information (such as indicator icon 410, time 412, email address 407, and subject 414) relating to a particular email in the listing are colored in the same fashion as the name 302 in FIG. 3. In another example, only the portion which was related to particular code is colored according to the criteria as set forth above. In another embodiment, the name or other portion of the email listing that is color coded is color coded by having a the text portion of the email listing colored such as shown in FIG. 5.

In another exemplary embodiment as shown in FIG. 4, the identification code or email address 407 of the sender or recipient is shown. The listing shown in FIG. 4 corresponds to the same listing as shown in FIG. 3, but the listing of FIG. 4 has the email address shown instead of the name of the sender or recipient. As illustrated in FIG. 5, the name 406 and the subject 414 are colored the same. In this color scheme, the text of the name 406 and subject 414 are colored according to the desired color scheme as implemented in the email display application.

In order to determine which email or email listing should be color coded, the email software is programmed in one embodiment to examine the information contained within the email or the address associated with the sender or addressee. For example, the email software applies color differentiation based upon the host name of the email sender or recipient. In at least one example, the host name refers to the portion of the email address that follows the symbol @ and precedes the domain extension such as .com and .org. As shown in FIG. 4, the portion that precedes the @ symbol of the email address 407 specifies the intended party. The portion after the @ symbol is either the company domain name or other domain name that the particular user is associated with. This domain name can be a public domain that allows users to sign up for free accounts or pay for account services through the company. For example, considering the email received at 9:23 am, the user name is "john.brown" and the company domain is "hrabc.com."

While most of the above apply to both incoming and outgoing messages, outgoing messages can further benefit through the use of color coding of email addresses or email recipient names. For instance, a user may wish to reply to a message, but may not fully appreciate all of the intended recipients' names. Thus, the addressees' names or email addresses can be color coded as described above. This allows the sender of the email message to determine whether the recipients are those to whom the message to should be sent. For example, a user may receive an email message where two parties are involved in negotiation between each other and would like to safely remove all outside parties from the email. Through the use of color differentiation, the user could easily remove those outside the intended list and know those other party will not receive the message. Having the recipients and/or senders color differentiated allows the user of the handheld device to easily determine to the addressee or sender of the email message. Additionally, when the user is sending a confidential matter, which could have disastrous effect if sent to the wrong addressee, an additional visual cue is provided to the sender of the email.

Figure 6:
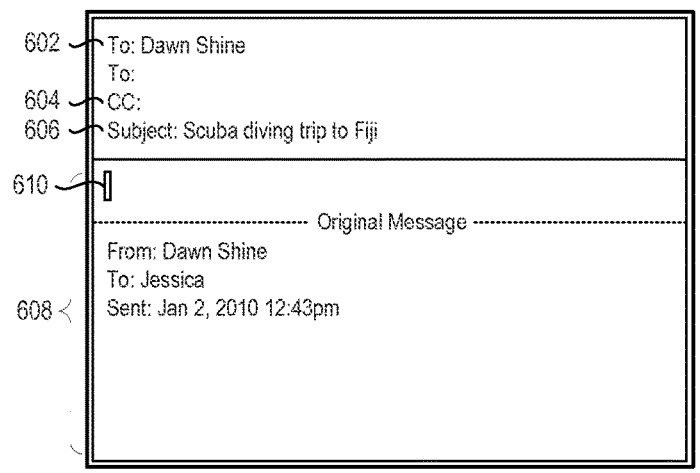
FIG. 6 illustrates a display screen showing the addressing fields, subject field and message body of an email drafting screen.

FIG. 6 presents a display showing an exemplary embodiment of an email program where the user has initiated a response to a received email message. The email message response includes a "To:" field 602 which indicates the recipients of the email message, a "CC:" field 604 for carbon copying recipients, a "Subject:" field 606 which indicates the subject of the email, and the body 608 of the email. The body 608 of the email is where the user inputs text for transmission. If the email is a reply to a previous email, the body 608 can include at least a portion of the previous email message that was sent. A cursor 610 is often implemented as part of the email display program to indicate where the text will be input.

The addressee indicated in the "To:" field 602 can be colored so as to allow the user to differentiate among recipient addresses when sending a message. In the instance as shown in FIG. 6, the email is addressed to "Dawn Shine." This email address is color differentiated from other addressees and can be distinguished by the user when sending a message to a particular recipient. It is possible for the user to determine whether the addressee matches one of the predefined categories as described above. In this case, Dawn Shine would be an approved contact and have the color-coding associated with an approved contact. Thus, in the scenario where a user may have a contact that is an approved contact with the same name as an unapproved contact, the user can determine which one of these two contacts the email is addressed to or received from. While the above examples provided in FIG. 6 is a reply to emails, other embodiments of the presently described disclosure can include original email messages. In the embodiment where an original email is sent, the same basic information is involved.

As mentioned above, a common characteristic, upon which color differentiation is based, is a host name included in an identification code of the respective email's sender. The host name can include the domain name from which the message is sent as well as the domain listed as the reply address. As described above, the host name can be the portion that appears after the @ symbol in the identification code, such as the email address. Other codes can likewise be used, such as sender's name. The received emails that have like host names can be same-color coded, such as the organization group 306 as shown in FIG. 3. While in another example, received emails having different host names are colored differently.

In yet another embodiment, the email software program identifies an email recipient uniquely color codes emails with the same host name in comparison to other display-listed received emails. While in another exemplary embodiment the email software program classifies email based upon host names—if the email is an approved email source then it is uniquely color coded in comparison to the received emails listed on the display. In still another exemplary embodiment, the email software program classifies received emails based upon an unapproved email source and the emails are uniquely color coded in comparison to other display-listed received emails. While the above embodiments have been described independent from each other, in at least one embodiment the received email is classified by the email software program using at least one of an approved email classification, an unapproved classification, and a same host name. In a particular embodiment, all of these classifications are implemented by the email software program.

Examples of these different color codes can be seen in FIGS. 3-5. In FIGS. 3 and 4, a listing of emails is shown on the display screen 102. The two listings shown in FIGS. 3 and 4 differ in how the addressee's or sender's identification is shown. As shown in FIG. 3, the identification of the addressee or sender involves displaying the name associated with that party. While in FIG. 4, the identification of the addressee or sender is indicated through an email address associated with that party. The emails in both FIGS. 3 and 4 are color-coded based upon groups such that there is an organizational group 306 (which in one embodiment has the same host name associated therewith), an approved group 308, and an unapproved group 310. The emails are respectively colored, respectively, based upon the following criteria: same organization as the operator, an approved list contacts, and an unapproved list. In yet another example as shown in FIG. 5, all the email messages are colored differently since each email 504, 506, 508 has a different host name associated therewith.

When a handheld device has an email software program as described above, the criteria for establishing the color-differentiation is required to be input into the email software program. In at least one embodiment, the criteria for color-differentiation is user-programmable, allowing the user to select which settings to be implemented along with its relevant color options. For example, the user could select whether to implement a color differentiation that allowed for certain messages from users within a particular host group to be color differentiated from other messages. The user could further select any one of the above described criteria for differentiating the addressee or sender of a given email message. In yet another embodiment, the criteria for color-differentiation is preset and non-changeable. Thus, the user would be required to use the preset criteria. While the user may not be able to program the desired criteria, at least one embodiment contemplates the use of administrator privileges that allow the administrator of the company to control the criteria for the handheld wireless communication devices.

When the user desires to send an email message from the communication device, an outbound email display application is implemented. This outbound email display application presents fields for the user to input data into such as a "To:" field, a "CC:" field, a "Subject:" field, and body field. In at least one embodiment, other addressing fields are implemented to further provide the user with different addressing options that are typically found within email programs. In one embodiment, the outbound email is color-coded prior to sending. The color-coding is based on a host name included in an identification code of the outbound email's recipient. When selecting the addressees of the email message, a portion of the email is color differentiated based upon one of the host name, an approved email addressee, and an unapproved email addressee. The host name is the part of the identification code as described above. Further examples of this have been provided above in relation to FIG. 6.

The outbound email display application can also display a list of messages that have been sent from the device and at least a portion of the displayed email information is color-coded based upon a characteristic common to each sent email. This color-coding is based upon similar criteria to that of received email messages. In at least one embodiment, the characteristic common to each displayed email is a host name which is included in an identification code of the respective sent email's recipient. In other embodiments, the display-listed sent emails having like host names are same-color coded. In yet another embodiment, the display-listed emails having different host names are different-color coded. Furthermore, the software program can present emails that are uniquely colored if the email recipient is an approved recipient. While in another embodiment, a unique color coding is applied to portion of an email message when the email recipient is uniquely color coded.

When the address list is long and a specific name, color coded as described above, appears in a part of the list that is not viewable on the screen or in the window presented on the screen when the email sender is creating an email message, the alert provided by a color coded name is likely to be missed. In many instances, it is desirable to have the electronic device cause the alert to be unavoidable for the sender. To this end, a visual indication is provided on the entirety of the message generating portion of the screen when a message composition window is opened for drafting, and a designated recipient meets certain criteria. With this system, the user cannot avoid observing the indication while viewing the draft of a potential outgoing message.

Figure 7:
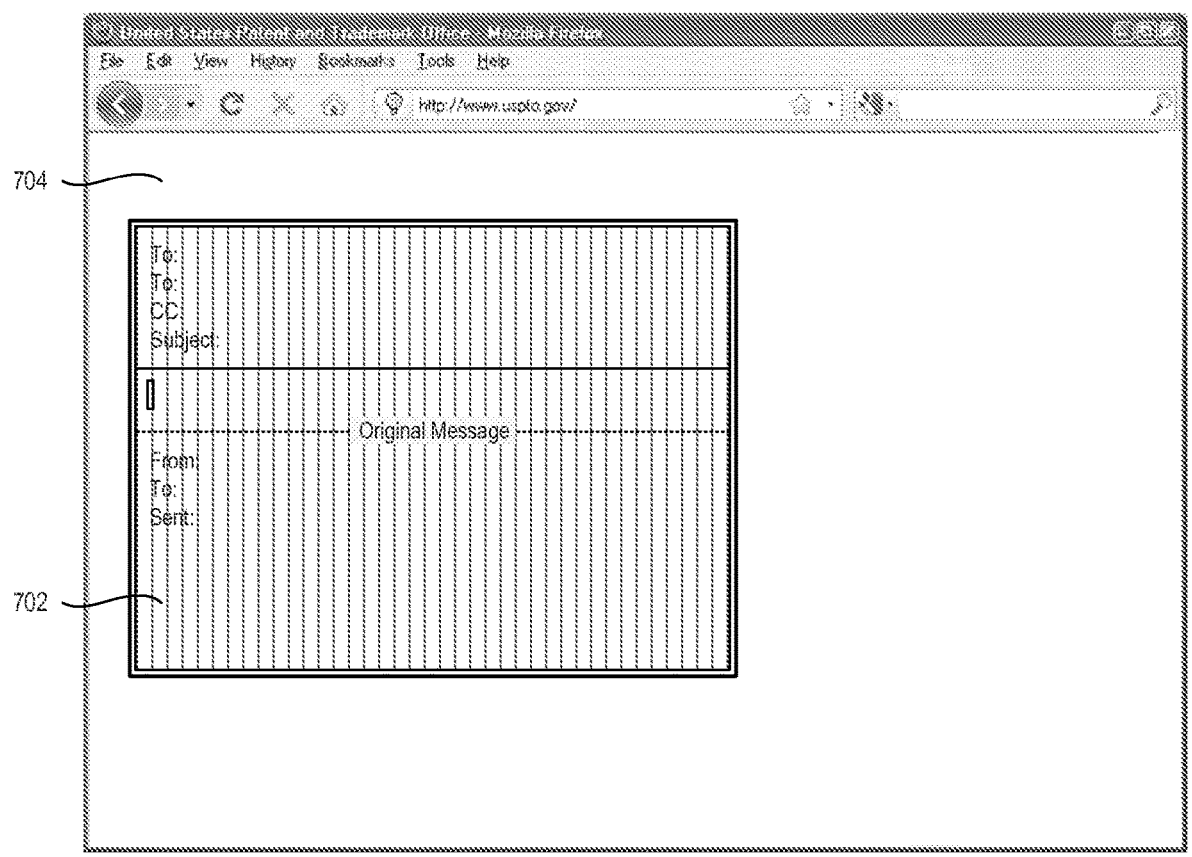
FIG. 7 illustrates a display screen including a window for email messaging.

In general, a screen parameter or experience is changed if certain conditions worthy of a warning to the message drafter are met. A visual indication on the screen (or in the message composition window, where the window occupies only part of the screen) includes one or a combination of indications to unavoidably get the drafter's attention. An illustration of an exemplary message composition window 702 within a larger screen area 704 is shown in FIG. 7. Here, the composition window background hue is changed for alerting purposes among several different colors: white, green, orange, red, gray, or other colors that are selected for visual clarity but will still allow typing over the colored background. As shown, the message composition window in FIG. 7 has been changed to the color red as an alert to the message drafter. It is desirable that color sets are selected to minimize the risk of misidentification by color blind users. Other types of changes to the entire message window will serve as an alert to the message drafter, for example but without limitation, the frame of a message composition window (if the window is so arranged) will be changed. Alternatively, or in combination, the background of either the entire screen or the message composition window will be grayscale patterned, for example with a watermark or lines. Such a watermark may read "Outside Recipient" or another phrase or word that alerts the drafter to a problem with the message or one of the addressees. Lines may be at any angle, and may be only parallel, or may include intersecting lines. Combinations of the above may be used, for example background colors, watermarks, and frames, to indicate among multiple severities of warnings, or multiple simultaneous warnings. However, the visual indications employed should permit typing of a message, for at least low level warnings, so such warnings should not be so obtrusive as to obscure the message text. Decorative message backgrounds, for example wallpaper in html email messages, may need to be over-ridden or removed.

Conditions that lead to the unavoidable alert presented on the screen of the communication device are typically those that would inadvertently leak proprietary information out of an organization by failing to verify that all of the designated recipients of that email (i.e., all of the names in the TO, CC and BCC address fields), are members of that organization (i.e., employees of the same company). Or, those messages that start out as communications marked "Company Confidential" or "Attorney Client Privileged" but are distributed to individuals that are not under an obligation of confidentiality or not sent to an attorney risk the loss of a claim of confidentiality or privilege for any material included within the message. The message that leaks information may be one that originates with the message drafter. Even more likely, an email message that is forwarded to a new set of addressees that do not meet the requirements of message information handling that the original message required inadvertently leaks information that was not intended for the new addressees. A handheld wireless communication device with its excellent mobility and immediacy offers an unwanted opportunity to inadvertently send messages to inappropriate recipients as a result of these advantages. An indication that is visible throughout the message window reduces the possibility of message distribution error.

Figure 8:
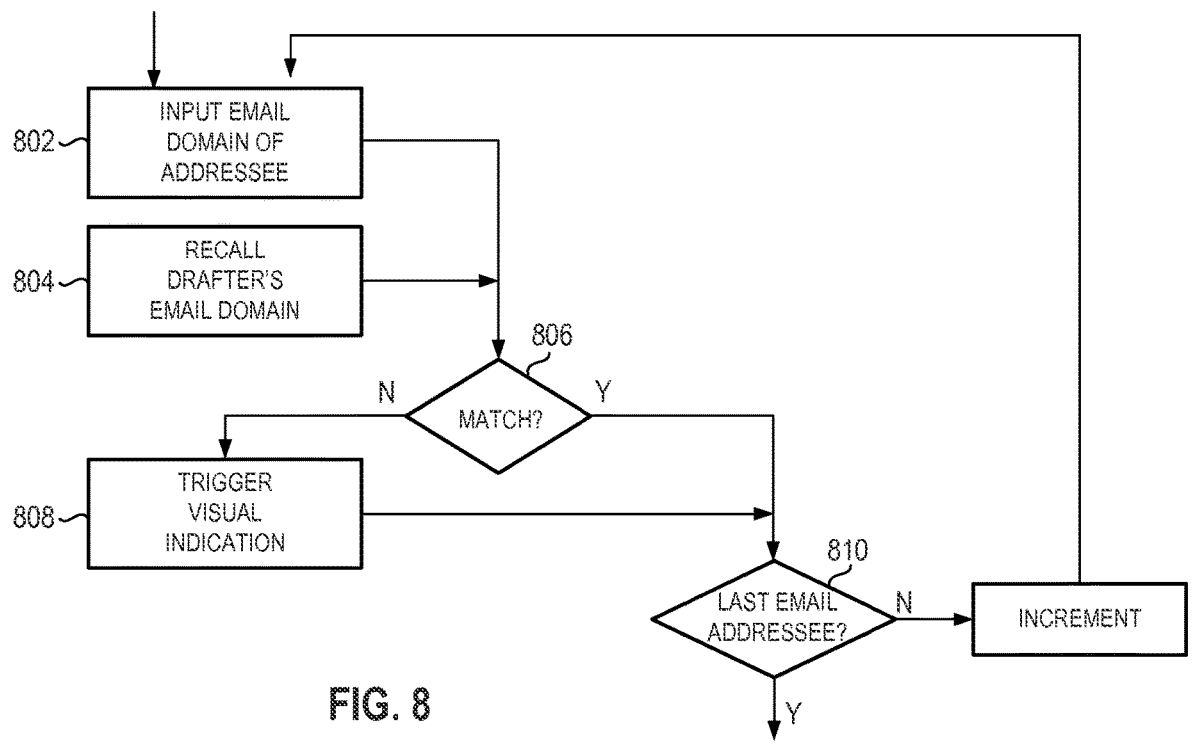
FIG. 8 is a flowchart of one embodiment of the disclosure.

Consider, now, the process shown in the flowchart of FIG. 8. A message drafter is about to create (or forward) a message to be sent to a list of addressees. A series of computer instructions—recalled from memory and processed by a microprocessor, as described above—are employed to determine whether an alert is to be given to the drafter. In this embodiment, the concern is that addressees be members of the drafter's organization. The email domain of an addressee is input at 802 and the email domain of the drafter is recalled at 804. The two domains are compared for a match at 806 and if the domains do not match, a visual indication is triggered at 808 so that the message window is changed to provide an unavoidable alert to the drafter. If the domains match or following the trigger of the visual indication, a determination of whether the last addressee has been evaluated is made at 810 and either the email domain of the next addressee is input or the program exits depending upon the determination of step 810. Thus, addressees that are not members of the set "belong to the same organization as the drafter" (defined by the email domain) are potentially excluded since an alert is provided.

In an alternative embodiment, inclusion/exclusion is made on the basis of predetermined domains. Thus, a determination is based upon domains found in an email distribution list. For example if an addressee's email address is in one or more of "legal_department" and "approved_vendors" email domain lists an alert indication is not triggered. The addressee's email domain is input at 902 in FIG. 9. The approved list is input at 904 and scanned for a match in the comparison at 906. A no match condition triggers the visual indication at 908 and a match (as well as the next step following the visual indication trigger) leads to a determination of whether the last addressee has been evaluated is made at 910. Either the email domain of the next addressee is input or the program exits depending upon the determination of step 910.

Figure 9:
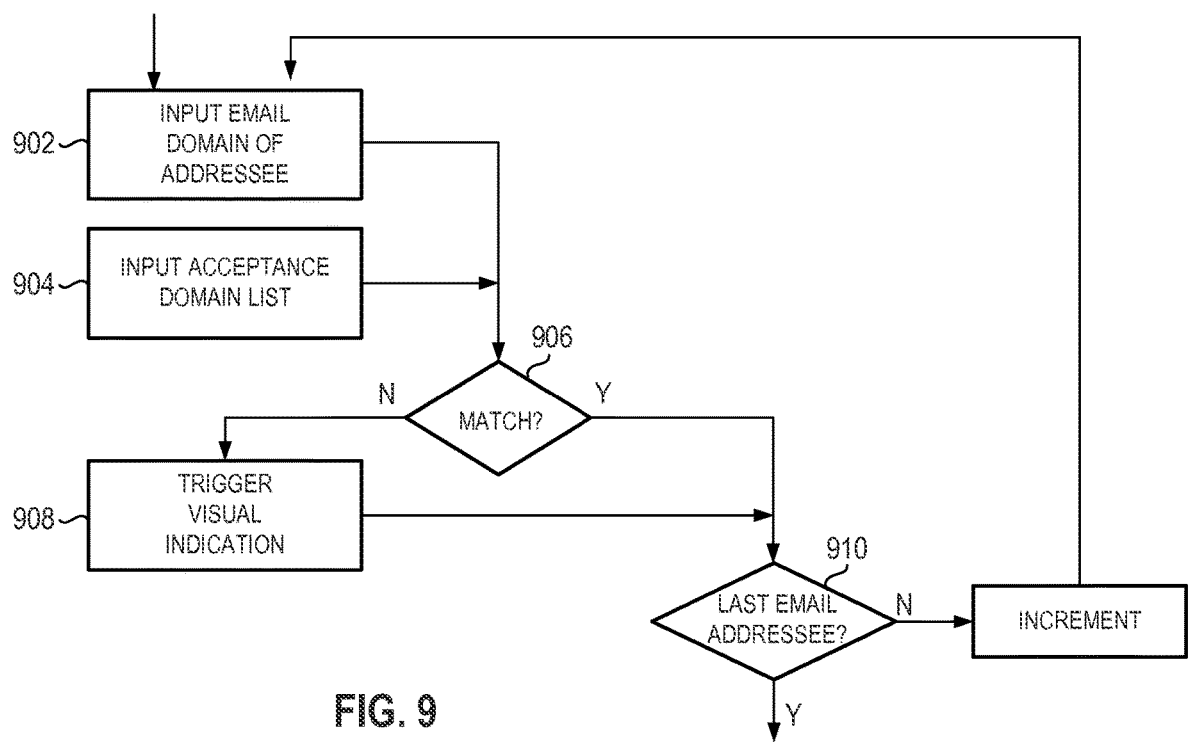
FIG. 9 is a flowchart of another embodiment of the disclosure.
Figure 10:
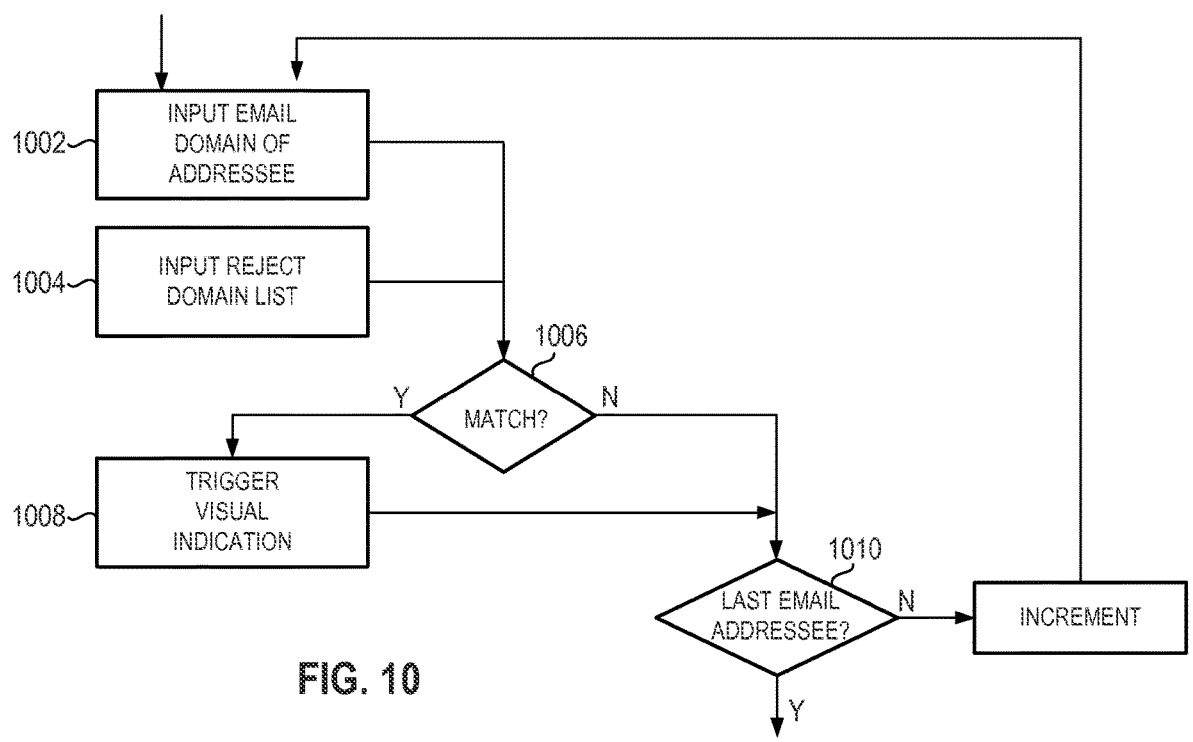
FIG. 10 is a flowchart of another embodiment of the disclosure.

The logical opposite of the embodiment of FIG. 9 is shown in the flowchart of FIG. 10, where a list of unacceptable, reject domains (or more granularly, unacceptable individual's domains) is maintained in the address book. The email domain of an addressee is input at 1002 and the reject domain list is input at 1004. The two domains are compared for a match at 1006 and when the domains match, a visual indication is triggered at 1008 so that the message window is changed to provide an unavoidable alert to the drafter that the addressee has been deemed unacceptable to receive the email message. If the domains do not match or following the trigger of the visual indication, a determination of whether the last addressee has been evaluated is made at 1010 and either the email domain of the next addressee is input or the program exits depending upon the determination of step 1010. Thus, addressees that are members of the set "belong to an unacceptable domain" are excluded and an alert is provided.

Figure 11:
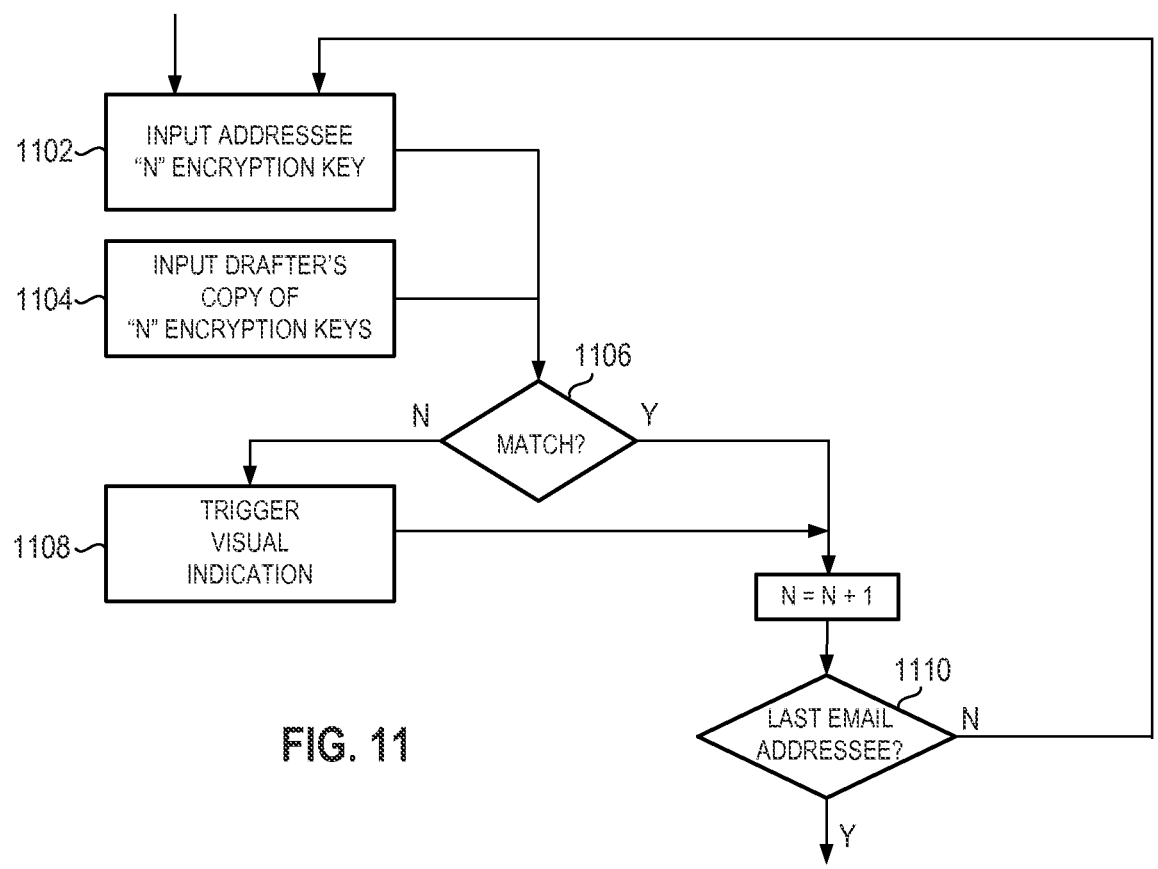
FIG. 11 is a flowchart of another embodiment of the disclosure.

The determination for triggering an alert in an alternative embodiment is based on whether the drafter possesses or has access to a valid encryption key that is associated with a designated recipient. For example, the drafter may possess a digital certificate for some or all potential recipients, and the email program encrypts outgoing messages if keys are available for all designated recipients. As shown in the flowchart of FIG. 11, the encryption key for addressee "N" is extracted from the certificate store and input at 1102. The message drafter's copy of encryption keys is input at 1104 and compared for a match with addressee "N's" key at 1106. An absence of a match leads to the trigger of a visual indication at 1108. A match (and the next step following the trigger of a visual indication) leads to an increment to the next addressee and a determination of whether the last addressee has been examined, at 1110. Either the email domain of the next addressee is input or the program exits depending upon the determination of step 1010.

Three methods of encryption technique are useful in three alternate embodiments. The first method encrypts the text of the email message and, optionally, the attachments with a session key that is generated at the commencement of the encryption process. For each recipient of an email, a copy of the session key is encrypted with the recipient's public key. Each encrypted session key is placed in (or appended or prepended to) a message identified with the recipient. For decryption, the specific encrypted session key is identified using identification found in the file. For example, the file is identified as: addressee_id1 (plain text); <key1> (ciphertext); addressee_id2 (plain text); <key2> (ciphertext); etc. The identified session key is decrypted with the recipient's private key and the message body (and attachments, if encrypted) is subsequently decrypted using the decrypted session key.

A second encryption technique embodiment includes the generation and encryption of the message body with a session key. A "successful decrypt" flag is appended to the session key, which flag is only recognizable if it is properly decrypted. In this embodiment, the session key is inserted in the message body and further used as the flag. For each addressee, a copy of the session key and its appended flag is encrypted with the addressee's public key. Each encrypted session key (and flag) is placed in the message, preferably in random order, without identification and the message is sent. Each addressee decrypts the first session key encountered and its flag with the addressee's private key. The flag is checked for validity and if it is valid, the message body is decrypted using the session key. If the flag is not valid, the decryption process is repeated using a private key until all keys are exhausted or a successful decryption is made.

A third encryption technique embodiment generates a session key for encryption. A "successful decrypt" flag is prepended to the message body and the message body and flag are encrypted with the session key. For each addressee, the session key copy is encrypted with the addressee's public key. Each encrypted message key is included in the message but without indication of which message key belongs to which addressee and preferably in a randomized order. The encrypted message is then sent. Each message recipient decrypts the first session key with the recipient's private key. The first block of the message body is then decrypted with the current session key and the flag is checked for validity. If the flag is determined to be valid, the remainder of the message is decrypted with the current session key. If the flag is not valid, a decryption of the next session key is attempted and decryption of the message body and flag is attempted with that next session key. The process continues until a valid flag is found or the number of session keys is exhausted.

Figure 12:
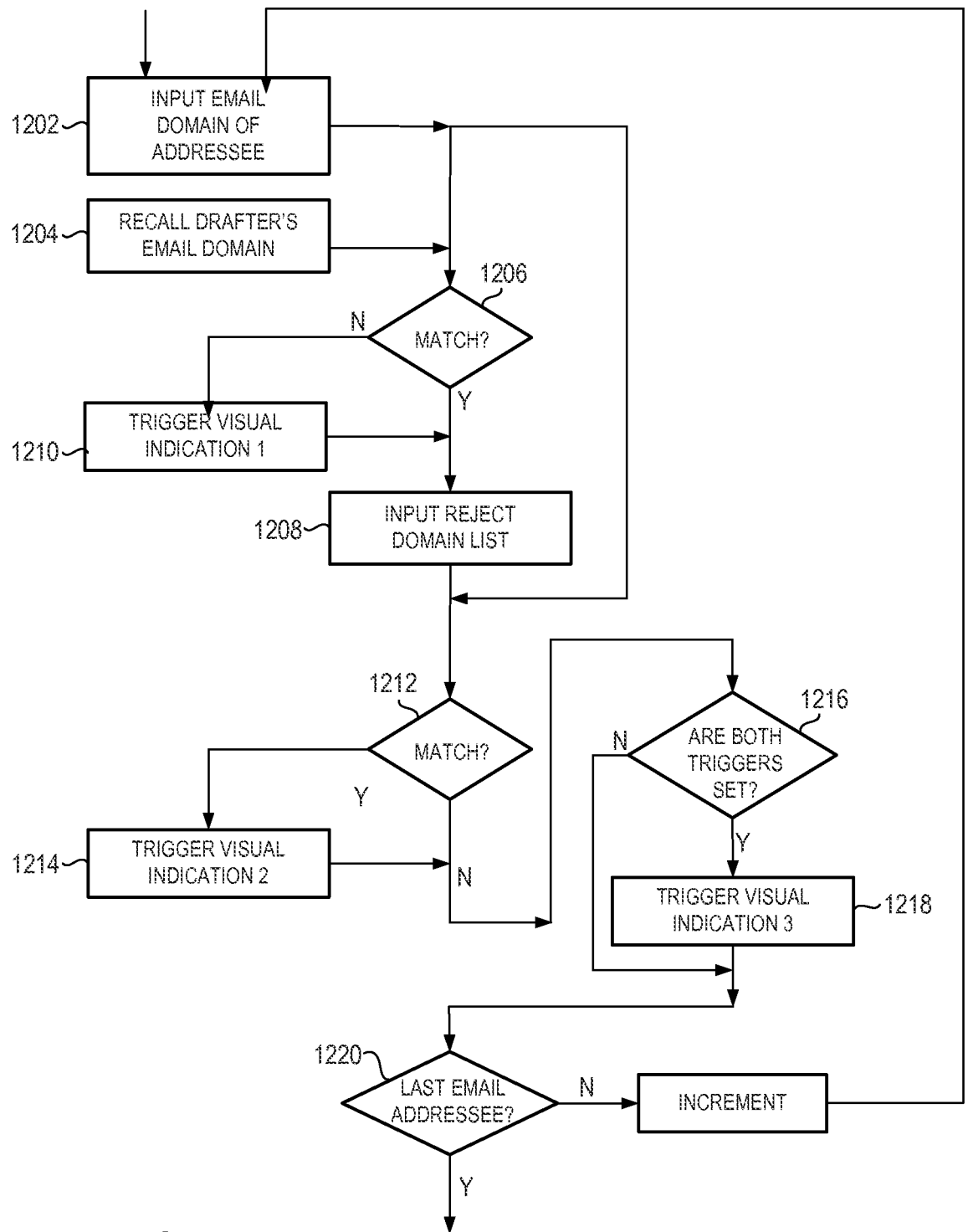
FIG. 12 is a flowchart of another embodiment of the disclosure.

Alert indications provide additional information to the drafter when the addressee characteristic is evaluated for reasons of exclusions from a desired set and reasons of inclusions in an undesired set. For example, the email domain of an addressee is input at 1202 in the flowchart of FIG. 12. The drafter's email domain is recalled at 1204 and the two domains are compared for a match at 1206. If a match is determined, a reject domain list is input from memory at 1208. If a match is not found, one type of visual indication is triggered at 1210 before the reject domain list is input. The addressee's email domain is compared to the reject domain list at 1212 and a trigger of a second type of visual indication is triggered at 1214. A match at 1212 (or following the second visual indication trigger) results in a determination, at 1216, of whether both visual indicators are set. If both are set, a trigger of a third type of visual indication is set at 1218 and the determination of whether the last email addressee has been evaluated is made at 1220, which is also entered from a determination that both the first and second triggers were set. When the last email domain has been evaluated, the program returns to the next operation of the communications device.

The evaluations described in the embodiments above have considered the email address of a selected addressee or plurality of addressees. Other parameters are evaluated in alternate embodiments. For example, key words in the Subject line or the body of the message trigger change which indications and criteria are used. Certain words or phrases, such as "Confidential" or "Attorney Client Privileged" trigger the use of certain criteria, such as whether an attorney is included in the TO line, or the list of available indications, such as certain reserved colors, or both are subject to be changed. These words may be standardized phrases that indicate sensitivity of information, or may be a customized list, such as code names of undisclosed projects. Further, there may be a differentiation based on the field in which a designated recipient field appears. For example, if an email address identified as one for an attorney appears in a CC field, rather than in the TO field, an indication will be triggered.

The subject line may be locked, and rendered unchangeable, if the email is a reply that quotes the content of the parent email. In this way, the user is prevented from disabling an indication, merely by changing the wording of the subject. This is important if an organization's policy prevents a message from being sent if the title indicates privileged material and there is an unauthorized address among the designated recipients. The message can then be sent by deleting the quote, thereby removing the privileged material, and then changing the distribution list.

While the above examples have been described in relation to email, one skilled in the art would appreciate the necessary modifications to allow lists and programs for SMS, MMS, PIN messages, instant messages, and similar messages to be displayed according to the above description provided in relation to email messages. Thus instead of an email program, the program could be one directed towards one of the above types of messages or the program could be capable of displaying all of the above types of messages. Likewise, the message that is displayed could be one of the above messages.

Exemplary embodiments have been described hereinabove regarding both handheld wireless communication devices 100, as well as the communication networks 206 within which they operate. Again, it should be appreciated that the foregoing disclosure teaches a resolution of the problem of inappropriately distributing or redistributing email messages by changing a characteristic of the expression of the message on a device display such that the user perceives an unavoidable visual indication.

What is claimed is:

1. A method comprising:
   accepting, by a wireless communication device, user input for a message addressed to a recipient, wherein a full content in a body of the message is deliverable to the recipient and the message includes a message address for the recipient;

identifying, automatically by the wireless communication device, a color code for the message based on a host name of the message address or a domain name of the message address;

before transmission of the message including the message address, displaying the message in a message composition window on a display of the wireless communication device, wherein the message composition window comprises a name of the recipient that is color-coded with the identified color code; and transmitting, by the wireless communication device, the full content in the body of the message to the recipient.

2. The method of claim 1, further comprising comparing the message address to a list of message addresses.

3. The method of claim 1, wherein at least one portion of the message composition window is color-coded by displaying colored text using the identified color code in the message composition window.

4. The method of claim 1, further comprising displaying a list of messages sent from the wireless communication device.

5. The method of claim 1, further comprising color-coding the message address.

6. The method of claim 1, wherein at least one portion of the message composition window is color-coded by displaying a colored background using the color code in the message composition window.

7. The method of claim 1, wherein the message address is an email address.

8. A wireless communication device, comprising:
a display configured to display messages;
an input interface for entering message content; and
a processor configured to:
   accept user input for a message addressed to a recipient, wherein a full content in a body of the message is deliverable to the recipient and includes a message address for the recipient;
   identify, automatically by the wireless communication device, a color code for the message based on a host name of the message address or a domain name of the message address; and
   before transmission of the message including the message address, cause display of the message in a message composition window on a display of the wireless communication device, wherein the message composition window comprises a name of the recipient that is color-coded with the identified color code; and
a transmitter configured to transmit the full content in the body of the message to the recipient.

9. The wireless communication device of claim 8, the processor further configured to compare the message address to a list of message addresses.

10. The wireless communication device of claim 8, wherein at least one portion of the message composition window is color-coded by displaying colored text using the identified color code in the message composition window.

11. The wireless communication device of claim 8, the processor further configured to cause display of a list of messages sent from the wireless communication device.

12. The wireless communication device of claim 8, the processor further configured to color-code the message address.

13. The wireless communication device of claim 8, wherein the processor is configured to color-code at least one portion of the message composition window by displaying a colored background using the color code in the message composition window.

14. The wireless communication device of claim 8, wherein the message address is an email address.

15. A non-transitory machine-readable medium with a set of instructions stored thereon, which when executed, cause a wireless communication device to perform operations comprising:

displaying a message including address information for a recipient before transmitting the message, wherein the message is addressed to a recipient and a full content in a body of the message is deliverable to the recipient, and the message includes a message address for the recipient;

identifying, automatically by the wireless communication device, a color code for the message based on a host name of the message address or a domain name of the message address;

before transmitting the message, displaying the message in a message composition window on a display of the wireless communication device, wherein the message composition window comprises a name of the recipient that is color-coded with the identified color code; and transmitting the full content in the body of the message to the recipient.

16. The non-transitory machine-readable medium of claim 15, wherein the message is one of an email message or a text message.

17. The non-transitory machine-readable medium of claim 15, wherein the operations comprise color-coding at least one portion of the message composition window by displaying a colored background using the color code in the message composition window.

18. The non-transitory machine-readable medium of claim 15, wherein the message address is an email address.

19. A wireless communication device, comprising:
a display configured to display messages;
an input interface for entering message content; and
a processor configured to:
   display a message including address information for a recipient before transmitting the message, wherein the message is addressed to a recipient and a full content in a body of the message is deliverable to the recipient, and the message includes a message address for the recipient;
   identify, automatically by the wireless communication device, a color code for the message based on a host name of the message address or a domain name of the message address; and
   before transmitting the message, display the message in a message composition window on a display of the wireless communication device, wherein the message composition window comprises a name of the recipient that is color-coded with the identified color code; and
a transmitter configured to transmit the full content in the body of the message to the recipient.

20. The wireless communication device of claim 19, wherein the message is one of an email message or a text message.

21. The wireless communication device of claim 19, wherein the message address is an email address.

22. A non-transitory machine-readable medium with a set of instructions stored thereon, which when executed, cause a wireless communication device to perform operations comprising:
  accepting a message address for a recipient;
  identifying, automatically by the wireless communication device, a color code for the message based on a host name of the message address or a domain name of the message address;
  before transmission of a message including the message address, displaying the message in a message composition window on a display of the wireless communication device, wherein the message composition window comprises a name of the recipient that is color-coded with the identified color code wherein a full content in a body of the message is deliverable to the recipient; and
  transmitting the full content in the body of the message to the recipient.

23. The non-transitory machine-readable medium of claim 22, wherein the color code is user programmable.

24. The non-transitory machine-readable medium of claim 22, wherein the color code is administrator programmable.

25. The non-transitory machine-readable medium of claim 22, wherein the message comprises an email message.

26. The non-transitory machine-readable medium of claim 22, wherein the message comprises a short message service message.

27. The non-transitory machine-readable medium of claim 22, wherein the message comprises one message of a list of messages, wherein a plurality of messages in the list of messages is color-coded.

28. The non-transitory machine-readable medium of claim 22, wherein a background of the message is color-coded.

29. The non-transitory machine-readable medium of claim 22, wherein the color code is a default color.

30. The non-transitory machine-readable medium of claim 22, wherein the message address is an email address.

31. A wireless communication device, comprising:
  a display configured to display messages;
  an input interface for entering message content; and
  a processor configured to:
    accept a message address for a recipient;
    identify, automatically by the wireless communication device, a color code for the message based on a host name of the message address or a domain name of the message address; and
    before transmission of the message including the message address, display the message in a message composition window on a display of the wireless communication device, wherein the message composition window comprises a name of the recipient that is color-coded with the identified color code wherein a full content in a body of the message is deliverable to the recipient; and
  a transmitter configured to transmit the full content in the body of the message to the recipient.

32. The wireless communication device of claim 31, wherein the color code is user programmable.

33. The wireless communication device of claim 31, wherein the color code is administrator programmable.

34. The wireless communication device of claim 31, wherein the message comprises an email message.

35. The wireless communication device of claim 31, wherein the message comprises a short message service message.

36. The wireless communication device of claim 31, wherein the message comprises one message of a list of messages, wherein a plurality of messages in the list of messages is color-coded.

37. The wireless communication device of claim 31, wherein a background of the message is color-coded.

38. The wireless communication device of claim 31, wherein the color code is a default color.

39. The wireless communication device of claim 31, wherein the message address is an email address.

* * * * *